United States Patent
Lee et al.

(10) Patent No.: US 9,083,491 B2
(45) Date of Patent: Jul. 14, 2015

(54) METHOD FOR TRANSMITTING A SIGNAL WHILE AVOIDING THE INFLUENCES OF AN INTERFERENCE SIGNAL EXISTING IN THE SAME CHANNEL IN A COMMUNICATION SYSTEM HAVING A MAIN COMMUNICATION DEVICE AND A PLURALITY OF TERMINAL COMMUNICATION DEVICES

(75) Inventors: Yong-Hwan Lee, Seoul (KR); Jin-Seok Han, Gunpo-si (KR); Seung-Hwan Lee, Suwon-si (KR)

(73) Assignee: SNU R&DB Foundation, Seoul (KR)

( * ) Notice: Subject to any disclaimer, the term of this patent is extended or adjusted under 35 U.S.C. 154(b) by 155 days.

(21) Appl. No.: 13/876,833

(22) PCT Filed: Sep. 2, 2011

(86) PCT No.: PCT/KR2011/006539
§ 371 (c)(1),
(2), (4) Date: Mar. 28, 2013

(87) PCT Pub. No.: WO2012/043991
PCT Pub. Date: Apr. 5, 2012

(65) Prior Publication Data
US 2013/0182602 A1    Jul. 18, 2013

(30) Foreign Application Priority Data
Sep. 28, 2010  (KR) ........................ 10-2010-0093904

(51) Int. Cl.
*H04L 1/00* (2006.01)
*H04J 11/00* (2006.01)

(52) U.S. Cl.
CPC ............. *H04L 1/0034* (2013.01); *H04J 11/003* (2013.01)

(58) Field of Classification Search
CPC ............................. H04L 1/0034; H04J 11/003
USPC .......................... 370/252, 328, 331, 332, 350
See application file for complete search history.

(56) References Cited

U.S. PATENT DOCUMENTS

| | | | |
|---|---|---|---|
| 6,501,785 B1 * | 12/2002 | Chang et al. | 375/133 |
| 7,372,866 B2 | 5/2008 | Jang et al. | |
| 7,450,904 B2 | 11/2008 | Cave et al. | |
| 7,796,988 B2 | 9/2010 | Cave et al. | |

(Continued)

FOREIGN PATENT DOCUMENTS

| | | |
|---|---|---|
| EP | 1257098 A2 | 11/2002 |
| EP | 1257098 A3 | 10/2003 |

(Continued)

*Primary Examiner* — Brian D Nguyen
(74) *Attorney, Agent, or Firm* — Wells St. John P.S.

(57) ABSTRACT

The method for transmitting a signal while avoiding the influences of an interference signal in the same channel according to the present invention comprises: a process in which communication devices in the communication system perceive, in a distributed manner, whether or not an interference signal exists in a transmission channel being used; a process in which the communication devices in the communication system temporarily transceive signals using a plurality of available transmission channels other than the transmission channel currently being used so as to avoid an interference signal if the interference signal is perceived; and a process of determining the channel having a best link state as a transmission channel from among the plurality of used transmission channels and returning to an existing transmission system using a single channel.

7 Claims, 4 Drawing Sheets

(56) References Cited

U.S. PATENT DOCUMENTS

| | | |
|---|---|---|
| 8,170,081 B2 * | 5/2012 | Forenza et al. ............... 375/141 |
| 2002/0167931 A1 | 11/2002 | Jang et al. |
| 2005/0153667 A1 | 7/2005 | Cave et al. |
| 2006/0264220 A1 * | 11/2006 | Chen et al. .................... 455/454 |
| 2008/0144493 A1 * | 6/2008 | Yeh .............................. 370/230 |
| 2008/0279146 A1 | 11/2008 | Cave et al. |
| 2010/0061356 A1 * | 3/2010 | Qvarfordt et al. ............. 370/338 |
| 2010/0323610 A1 * | 12/2010 | Li et al. ....................... 455/3.01 |
| 2011/0003608 A1 * | 1/2011 | Forenza et al. ............... 455/501 |

FOREIGN PATENT DOCUMENTS

| | | |
|---|---|---|
| EP | 1702479 B1 | 8/2009 |
| EP | 2151927 A1 | 2/2010 |
| KR | 102002-0086987 | 11/2002 |
| KR | 102005-0073430 | 7/2005 |
| KR | 102009-0092495 | 9/2009 |
| WO | WO 2005-070074 A2 | 8/2005 |
| WO | WO 2005-070074 A3 | 8/2005 |

\* cited by examiner

METHOD FOR TRANSMITTING A SIGNAL WHILE AVOIDING THE INFLUENCES OF AN INTERFERENCE SIGNAL EXISTING IN THE SAME CHANNEL IN A COMMUNICATION SYSTEM HAVING A MAIN COMMUNICATION DEVICE AND A PLURALITY OF TERMINAL COMMUNICATION DEVICES

CROSS REFERENCE TO RELATED APPLICATION

This is a 35 U.S.C. §371 application of, and claims priority to, International Application No. PCT/KR2011/006539, which was filed on Sep. 2, 2011, and published as Publication No. WO 2012/043991 A2, which claims priority to Korean Patent Application No. 10-2010-0093904, which was filed on Sep. 28, 2010, the entirety of all the applications are incorporated herein by reference.

TECHNICAL FIELD

The present invention relates to a method of sending a signal while avoiding the influence of an interference signal in the same channel in a communication system including a main communication device and a plurality of terminal communication devices.

BACKGROUND ART

When there is a plurality of communication systems that share the same band, a direct sequence spread spectrum (hereinafter "DSSS") system minimizes the influence of an interference signal within a band using band spread technology. As an example, a ZigBee system that is a kind of DSSS system spreads a transmission signal eight times and then sends the signal, thereby achieving processing gain with respect to narrowband interference that uses a narrower frequency band than ZigBee (as an example, for a Bluetooth signal, a signal-to-interference ratio (SIR) gain of 3 dB). However, when there is frequency static (hereinafter "FS") interference that generates interference in a frequency band wider than that of ZigBee in the same channel for a relatively long time, as in a wireless local area network (WLAN), the performance of the ZigBee system is considerably reduced. In order to overcome this problem, an IEEE 802.15.4-based ZigBee system determines that there is interference in a current channel if the packet error rate in a network exceeds 25%, and a coordinator in charge of the system determines an alternative channel from among a total of 16 channels using a conventional channel sensing technique, and then broadcasts this information to terminals within the network, thereby avoiding the interference. However, this is problematic in that alternative channel information is not reliably transferred because the information is transferred to the terminals through a current channel under the influence of the interference, and is also problematic in that the time it takes to change to a new channel, that is, to perform handoff, considerably increases when the load of an interference signal is high. Furthermore, it is problematic in that the time it takes to avoid interference considerably increases because channel sensing is sequentially performed on a total of 16 channels without consideration of interference characteristics, and is also problematic in that the conventional interference avoidance technique of the existing ZigBee has poor network connectivity because a terminal releases a connection to a current coordinator and then switches to an orphan device when the terminal has not successively received a beacon signal, that is, a network synchronizing signal. In order to avoid the problems of the message exchange-based interference avoidance technique, a pseudo-random channel selection-based interference avoidance technique was proposed. When interference has occurred in a channel, this technique performs handoff through an arbitrary channel that is selected based on the unique attribute value of a network (for example, a network ID index, a current channel index, or the like) without the exchange of alternative channel information between devices within the network. However, in the case of the pseudo-random channel changing method, the probability of interference occurring in a changed channel again is strong because the method determines a change to the channel without consideration of interference signal characteristics. If interference occurs in the changed channel again, a coordinator reconfigures a network, and thus the interference avoidance technique that performs avoidance using a single random channel upon the occurrence of interference may produce considerably poor performance in an environment in which there is a plurality of interference sources.

DISCLOSURE

Technical Problem

The present invention has been made keeping in mind the above problems occurring in the prior art, and is directed to a broadband interference avoidance apparatus and method for a communication system, including a main communication device and a plurality of terminals, that coexists with a heterogeneous system. The basic concept of the present invention is as follows. In accordance with the present invention, if it is determined, based on the channel and bandwidth characteristics of an FS broadband interference signal in a band, that interference has occurred, a plurality of candidate channels that will be used for handoff is determined. When an interference signal is detected, a main transceiver that manages the system sends a signal through the determined plurality of candidate channels using a frequency hopping method, and communicates through a single channel whose link quality is higher than a reference value if the single channel is present among the determined channels, thereby efficiently avoiding the influence of interference. This enables the present invention to overcome the problems of message exchange-based interference avoidance techniques, such as existing IEEE 802.15.4 ZigBee, and to considerably reduce the probability of re-interference that may occur in a pseudo random channel avoidance technique and the like, thereby achieving performance superior to that of the conventional techniques.

Technical Solution

In accordance with an embodiment of the present invention, there is provided a method of performing transmission while avoiding interference in the same channel, the method sending a signal while avoiding the influence of an interference signal generated in a channel currently being used in a communication system including a coordinator for periodically sending or receiving a signal through only one of a plurality of available transmission channels and a plurality of communication devices, the method including step (A) of detecting whether an interference signal is present in a transmission channel that is being used by the communication devices in the communication system in a distributed manner; step (B) of, if the presence of the interference signal is detected at step (A), temporarily sending and receiving, by the communication devices in the communication system, signals through an transmission channels, except for the transmission channel currently being used by the devices, in order to avoid interference; and step (C) of determining a channel having the best link quality condition, selected from among the transmission channels used at step (B), to be a transmission channel and returning to previous transmission mode that uses a single channel.

Step (A) may include the step of, if a transmission error occurs in the coordinator of the system, detecting the presence of the interference signal during an inactive period in which a signal is not sent using a conventional channel sensing technique, or if transmission performance is lower than a predetermined reference value (for example, if the number of received packets is smaller than a predetermined reference value, or if the packet transmission error rate or the number of packet retransmissions is larger than a predetermined reference value), detecting the presence of the interference signal in the channel being used; the step of, if the communication device in the system has not successively received a synchronizing signal that is periodically sent by the coordinator a predetermined number of times, or if the terminal has received a synchronizing signal into which an interference detection signal has been inserted, detecting the presence of the interference signal in the channel being used; and the step of, if the terminal has received the synchronizing signal after it has not received the synchronizing signal from the coordinator a predetermined or smaller number of times, notifying the coordinator that the interference signal is present in the channel being used, thereby causing the coordinator to become aware of the presence of the interference signal.

Step (B) may include step (B-1) of, if the interference signal is detected in the channel being used by the communication devices in the system, determining the transmission channels that will be temporality used in order to avoid interference; and step (B-2) of, if the presence of the interference signal is detected in the channel being used at step (A), temporarily sending and receiving signals through a candidate transmission channels determined at step (B-1) using a frequency hopping method.

Step (B-1) may include the step of determining M candidate transmission channels meeting requirements of Equations 1 and 2 from among N transmission channels available in the system while taking into consideration the characteristics of the interference signal $$|k_m - \tilde{k}| \geq \left\lfloor \frac{W}{d} \right\rfloor;$$ (1)
$$1 \leq m \leq M$$

$$|k_i - k_j| \geq \left\lfloor \frac{W}{d} \right\rfloor;$$ (2)
$$1 \leq i, j \leq M$$
and
$$i \neq j$$

and the step of determining, by the devices within the network, a set of candidate transmission channels $\Omega_M(\hat{q})$ having the candidate transmission channels as elements based on a unique attribute value of the network in order to reduce a burden of message exchange that is required when the coordinator transfers information about the determined candidate transmission channels to the communication devices.

The step of determining the set of candidate transmission channels $\Omega_M(\hat{q})$ may include the step of determining set index $\hat{q}$ of $\Omega_M(\hat{q})$ using a pseudo-random method, as shown in Equation 3, $$\hat{q} = 1 + (\text{ID.mod}.n(\Omega_M))$$ (3)

where W is the bandwidth of a primary interference signal, $\tilde{k}$ is the index of the channel that is currently being used by the system, d is frequency spacing between adjacent channels, ID is the ID index of the network, ".mod." is a remainder operation, and $n(\Omega_M)$ is a total number of sets of the candidate transmission channels each having candidate transmission channels that can be generated in the determination.

Step (B-2) may include the step of if the coordinator detects the presence of the interference signal at step (A), repeatedly sending a synchronizing signal into which an interference detection signal has been inserted during a subsequent active period, and then temporarily sending a signal sequentially using the candidate transmission channel determined at step (B-1) during each subsequent active period; and the step of, if the communication device detects the presence of the interference signal at step (A), detecting the synchronizing signal sent by the coordinator in the candidate transmission channels during a period $T_{sync,MT}$ determined as shown in Equation 4, and, if the synchronizing signal is detected, temporarily sending and receiving signals sequentially using the candidate transmission channels determined at step (B-1)

$$T_{sync,MT} = \begin{cases} T_{sf}, \text{ in the case in which } interference \text{ is detected by} \\ \text{receiving synchronizing} \\ \text{singnal into which inteference detection signal has been} \\ \text{inserted} \\ MT_{sf}, \text{ in the case in which } interference \text{ is detected by} \\ \text{successively} \\ \text{losing synchronizing signal predetermined number of times} \end{cases}$$

where $T_{sf}$ is the period of the synchronizing signals that are sent by the coordinator through the candidate transmission channels, and, if the detection of the synchronizing signal has failed a predetermined or larger number of times, the communication device is determined to an orphan device and should undergo a process of subscribing to the network again.

Step (C) may include the step of measuring, by the coordinator, the link quality of the candidate transmission channels during a predetermined period, and selecting, by the coordinator, a transmission channel having the best link quality; and the step of sending a synchronizing signal from which the interference detection signal has been removed and which is normally used when sending a signal through the selected transmission channel, and thus returning to a previous single channel transmission and reception mode in which all of the communication devices in the system use the selected transmission channel.

Advantageous Effects

The present invention includes a multi-channel selection technique, an interference detection technique, a multi-channel transmission and reception technique, and a final channel selection technique in a communication system that includes a main communication device and a plurality of terminals. When interference occurs in the same channel, devices within a network detect interference based on a sent signal and the reception performance of the signal, and operate through a previously promised multi-channel, thereby avoiding the interference by transferring alternative channel information in message form, or minimizing delay in handoff that occurs when avoidance is performed through a single channel that is selected by a pseudo random method without the exchange of messages. In particular, when a multi-channel combination is selected, the channel and bandwidth information of frequency static interference is utilized, thereby providing superior performance in an environment in which there is a plurality of frequency static interference sources, compared to conventional interference avoidance techniques.

MODE FOR INVENTION

The operating principle of preferred embodiments of the present invention will be described in detail below with reference to the accompanying drawings. In the following description of the present invention, detailed descriptions of known functions and constructions which have been deemed to make the gist of the present invention obscure will be omitted. Furthermore, the definitions of the terms that will be used below should be made based on the technical spirit that is described throughout the specification.

Figure 1:
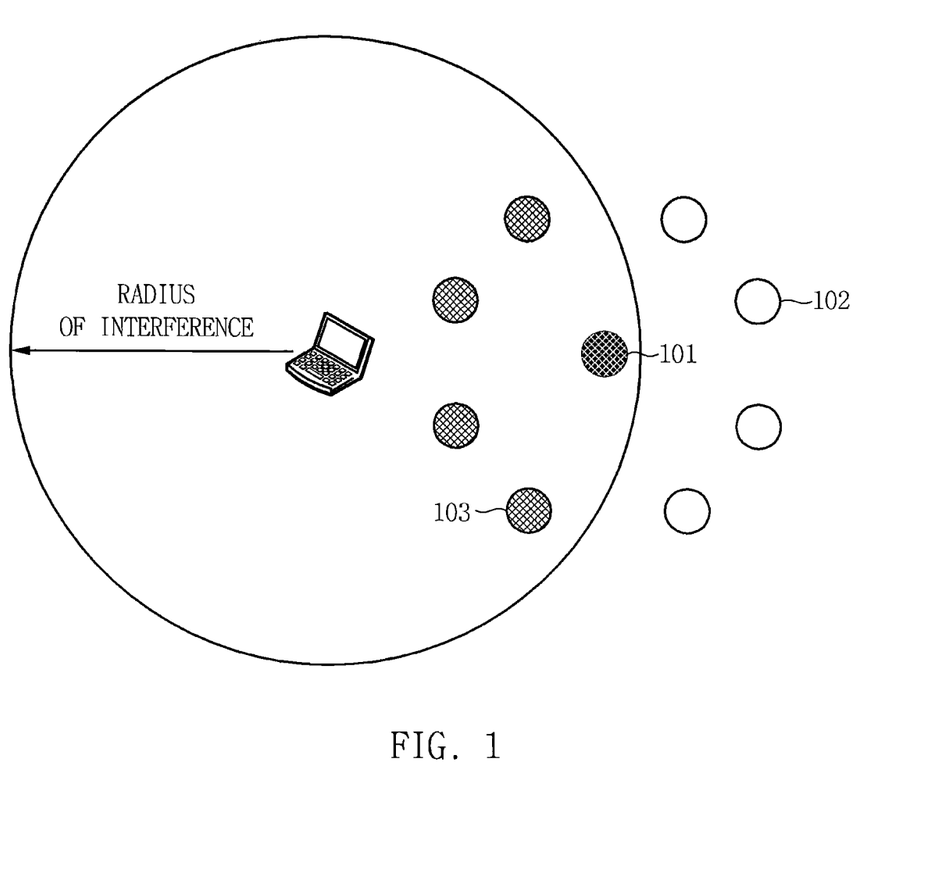
FIG. 1 is a diagram illustrating a model for the interference between a communication system having a star topology structure that includes a single main transceiver, configured to manage the system, and a plurality of terminals and another communication system.

For convenience of description, let us consider a communication system having a star topology structure that includes a single main transceiver 101, configured to manage the system, and a plurality of terminals 102 and 103, as illustrated in FIG. 1. It is assumed that the transceiver devices in the system transmit and receive signals using a super-frame structure including an active period in which communication is performed and an inactive period in which communication is not performed. Here, the duration of a super-frame may be defined, as shown in Equation 1:

$$T_{sf} = N_{sf} t_{sym} \quad (1)$$

Here, $N_{sf}$ denotes the number of symbols that constitute the super-frame, and $t_{sym}$ denotes the symbol duration of the system. The main transceiver sends a synchronizing signal (as an example, a beacon in the case of Zigbee) in the starting section of each super-frame, thus being synchronized with terminals within a network. The terminal operates its receiver for a maximum of $T_{sync}$ in order to receive the synchronizing signal that the main transceiver sends at $t=nT_{sf}$. If the terminal fails to receive the synchronizing signal within the time period, it is determined that synchronization with the main transceiver has failed. Furthermore, it is assumed that the system supports non-overlapping N channels in order to support a plurality of homogeneous transceiver systems. The center frequency $F_k$ of a k-th channel may be expressed, as shown in Equation 2:

$$F_k = F_1 + d(k-1); k = 1, \ldots, N \quad (2)$$

Here, k denotes a channel index (hereinafter "channel"), and d denotes the frequency spacing between adjacent channels (as an example, in the case of ZigBee, N=16, $F_1$=2405 MHz, and d=5 MHz).

Figure 2:
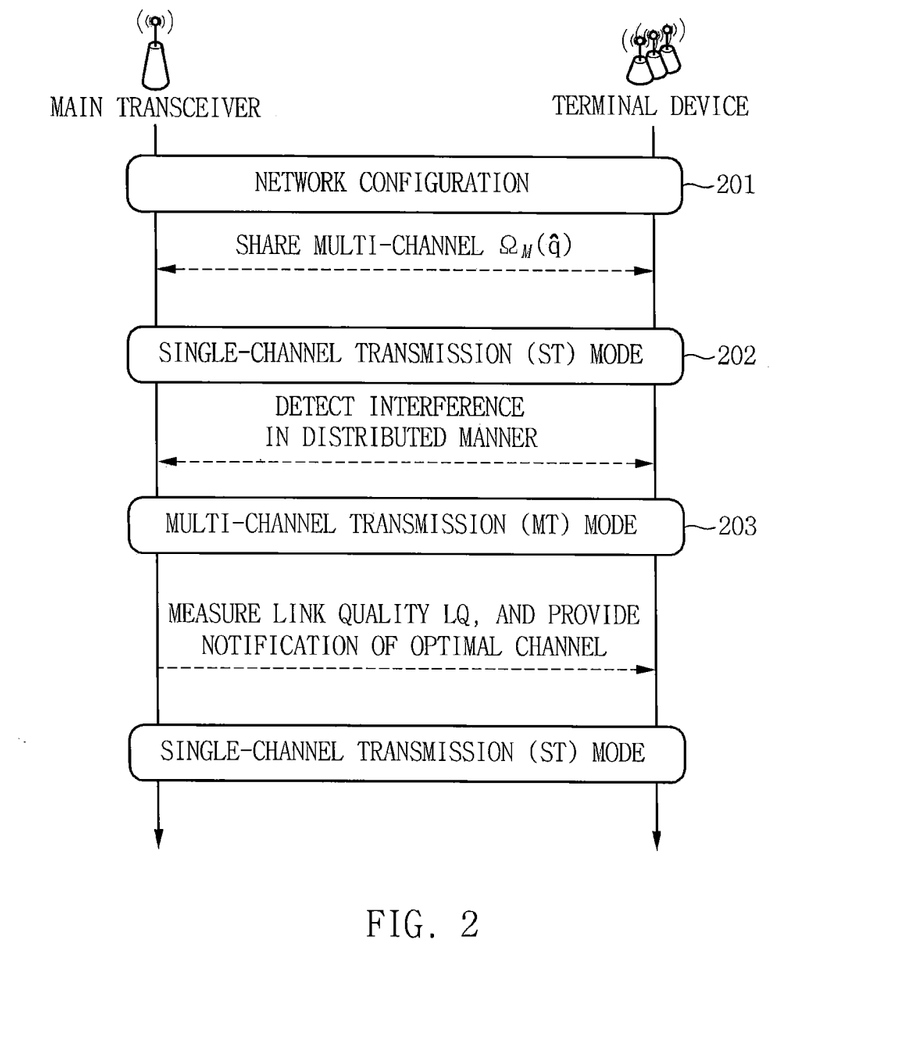
FIG. 2 is a conceptual diagram illustrating a process of avoiding interference over time in accordance with the present invention.

The overall configuration of the present invention is as illustrated in FIG. 2. At step 201 of FIG. 2 at which a network is configured, the devices within the network determine a plurality of candidate channels that will be used for handoff if an interference signal is generated. Let us consider a set of M candidate channels $\{k_1, \ldots, k_M\}$ that are selected from among N channels available within a system band and will be used for handoff. Here, each channel $k_m (1 \leq m \leq M)$ is selected to meet the requirement of Equation 3 based on the channel and bandwidth characteristics of an FS interference signal and the channel characteristics of the target system.

$$|k_m - \tilde{k}| \geq \left\lfloor \frac{W}{d} \right\rfloor \quad (3)$$

Here, W denotes the bandwidth of the FS interference signal (as an example, W=22 MHz in the case of a WLAN), and $\tilde{k}$ denotes a channel that is currently being used by the network. If the channel $\tilde{k}$ currently being used is subjected to the influence of the FS interference, the probability of re-interference can be reduced by selecting channels while excluding one or more channels that have a strong possibility of being under the influence of the FS interference, as shown in Equation 3. Furthermore, the spacing between two different candidate channels $k_i$ and $k_j$ is selected to meet Equation 4:

$$|k_i - k_j| \geq \left\lfloor \frac{W}{d} \right\rfloor; \quad (4)$$
$$1 \leq i, j \leq M \text{ and } i \neq j$$

When interference occurs, transmission and reception is performed using a frequency hopping method using channels that meet the requirement, and thus the probability of re-interference with respect to a new transmission channel is considerably reduced even in an environment in which there is a plurality of FS interference sources, thereby achieving superior performance compared to a conventional single channel avoidance technique. In the present invention, a set of handoff candidate channels that meet Equations 3 and 4 is defined as a multi-channel. There may be a plurality of multi-channels depending on the channel characteristics of the interference signal and the channel characteristics of the target system (as an example, if a WLAN is assumed to be the FS interference signal when the number of channels of a ZigBee system is 7, {1,11,16}, {3,12,16}, {2,11,15} is a multi-channel, and {4,9,10}, {1,8,15}, {2,10,13} is not a multi-channel. Furthermore, if M≥4, there is no multi-channel.

Although there may be a plurality of multi-channels depending on the channel characteristics of the interference signal and the channel characteristics of the target system, all devices that belong to the network should select the same multi-channel from among the plurality of multi-channels. If the number of multi-channels each composed of M channels is $n(\Omega_M)$, a q-th multi-channel $\Omega_M(q)$ may be expressed, as shown in Equation 5:

$$\Omega_M(q) = \{k_{1,q}, \ldots, k_{M,q}\}; q = 1, \ldots, n(\Omega_M) \quad (5)$$

Here, $k_{m,q} (1 \leq m \leq M)$ denotes an m-th channel. Thereafter, the index q of the multi-channel is selected with the overhead of message exchange between the devices within the network minimized. As an example, the selection may be performed using a pseudo-random method based on the unique attribute value of the network (that is, a network ID index, a main transceiver address, or the like). If the ID of the network may be used in a variable manner, the index of the multi-channel may be selected, as shown in Equation 6:

$$\hat{q}=1+(ID.mod.n(\Omega_M)) \qquad (6)$$

Here, ID denotes the ID index of the network, and ".mod." denotes a remainder operation. If an interference signal is detected in the channel being used, the devices within the network communicate using multi-channel $\Omega_M(\hat{q})$.

Step 202 of FIG. 2 is a step at which the devices within the network operate in single-channel transmission mode (hereinafter "ST mode") using channel $\hat{k}$. During an operation in ST mode, the main transceiver that manages the system and the terminals determines whether there is an interference signal in a transceiver channel based on a transmitted signal and the reception performance of the signal in a distributed manner.

The main transceiver determines whether there is an interference signal in a channel using a conventional channel sensing technique, such as that of an energy detector (hereinafter "ED") if a transceiver error occurs during an ST mode communication. Even when an interference signal has not been detected using channel sensing, it is determined that there is an interference signal in a channel if reception performance, such as packet error rate, does not reach a specific reference value. As an example, if the number of received packets is smaller than a specific reference value, the number of transmission/reception errors is equal to or larger than $N_P$ with respect to a specific terminal, or the packet error rate (hereinafter "PER") is a predetermined reference value, it is determined that there is an interference signal in the channel. If an interference signal has been detected in the channel, the main transceiver repeatedly sends a synchronizing signal into which a multi-channel transmission mode (hereinafter "MT mode) instruction (an interference detection signal) has been inserted in the active interval of a subsequent period, and then switches to MT mode.

If, during ST mode communication, the terminal receives a synchronizing signal into which an interference detection signal has been inserted from the main transceiver, or does not receive a synchronizing signal from the main transceiver a number of times equal to or larger than a specific number, the terminal determines that there is an interference signal in the channel, provides notification thereof to the main transceiver, and then switches to MT mode. If the main transceiver receives notification that there is an interference signal in the channel from the terminal, the main transceiver inserts an MT mode instruction into a synchronizing signal in a subsequent period, sends the synchronizing signal over the channel currently being used, and switches to MT mode.

Figure 3:
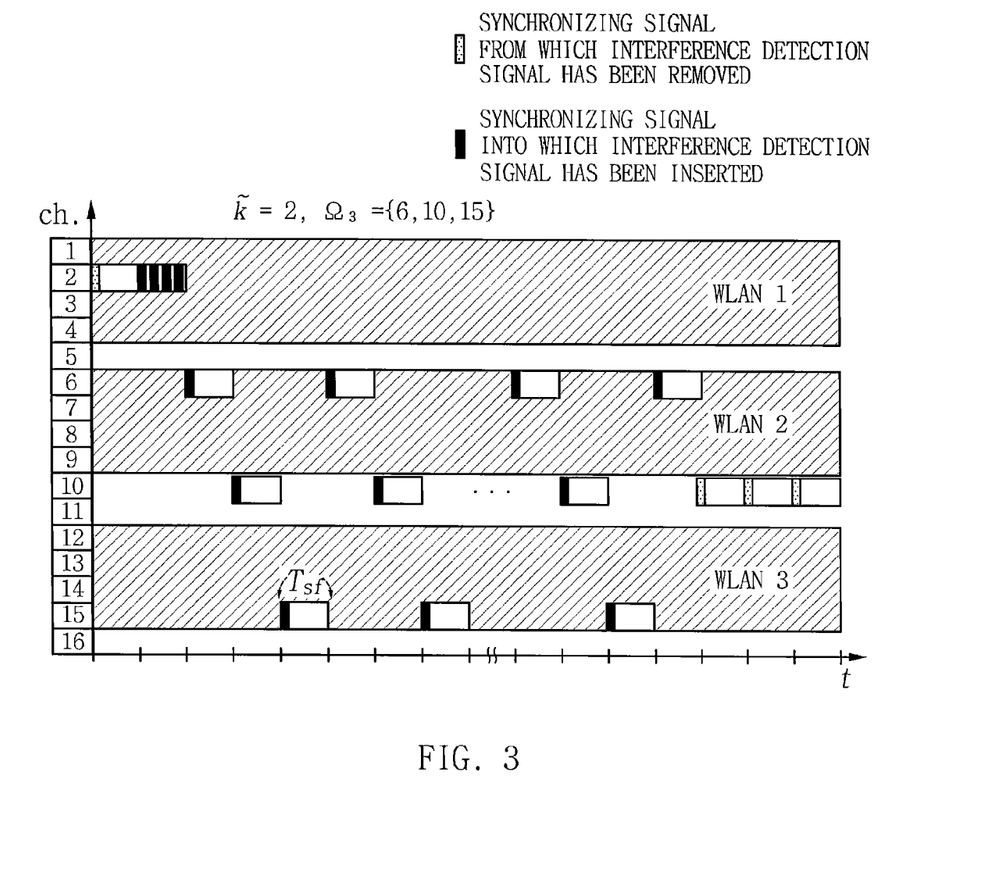
FIG. 3 is a diagram illustrating an example of an interference avoidance process in accordance with the present invention.
Figure 4:
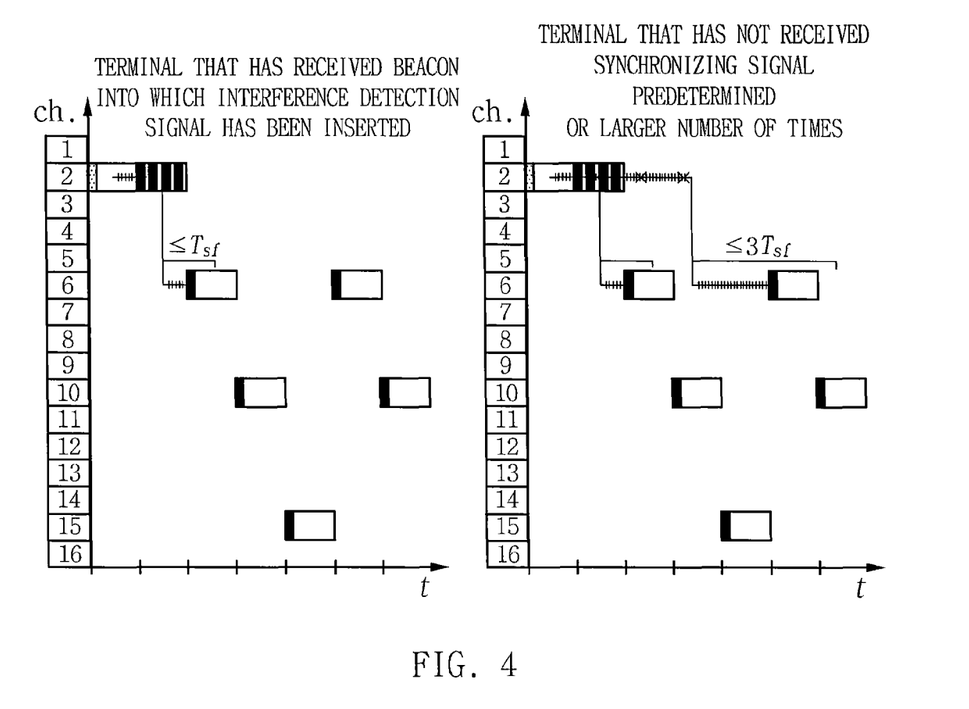
FIG. 4 is a diagram illustrating an example of a process in which a terminal avoids interference in accordance with the present invention.

Step 203 of FIG. 2 is a step at which the devices within the network operates in MT mode through channels that belong to $\Omega_M(\hat{q})$. When switching to MT mode, the main transceiver sends a synchronizing signal into which an interference detection signal has been inserted together with a data signal using a frequency hopping method that sequentially uses the channels that belong to $\Omega_M(\hat{q})$ (see FIG. 3). In contrast, the terminal that has switched to MT mode looks for a synchronizing signal in a first channel $$k_{1,\hat{q}}$$

in $\Omega_M(\hat{q})$ to synchronize with the main transceiver. When having received a synchronizing signal within $T_{sync,MT}$, the terminal sends and receives data while sequentially hopping among the channels that belong to $\Omega_M(\hat{q})$. When having not received a synchronizing signal within $T_{sync,MT}$, the terminal increases the number of synchronizing signal losses $n_{b,MT}$ by 1, and looks for a synchronizing signal in a subsequent channel. When $n_{b,MT}$ has become equal to given threshold value $N_{b,MT}$, the terminal switches to a process of subscribing to the network again. Here, the terminal sets $T_{sync,MT}$ to a different value depending on a method of switching to MT mode (see FIG. 4).

Since the terminal that has received a synchronizing signal into which an interference detection signal has been inserted from the main transceiver and has switched to MT mode can be aware of the times at which the main transceiver hops among the channels that belong to $\Omega_M(\hat{q})$, the terminal sets $T_{sync,MT}$ to $T_{sf}$ and then looks for a synchronizing signal. In contrast, when the terminal has not received a synchronizing signal and thus has switched to MT mode, the terminal cannot be aware of the times at which the main transceiver hops among the channels that belong to $\Omega_M(\hat{q})$, and thus should increase the period in which it looks for a synchronizing signal in a channel. That is, since the period at which a synchronizing signal is sent for each channel in MT mode increases M times than that in ST mode, the terminal sets $T_{sync,MT}$ to $MT_{sf}$ and then looks for a synchronizing signal.

During an operation in MT mode, the main transceiver selects a channel having the best link quality based on a sent signal and the reception performance of the signal. As an example, if channel $$k_{\hat{m},\hat{q}}$$

through which transmission and reception from and by with respect to all of the terminals is smoothly performed (for example, from which an ACK signal has been received) is found, the main transceiver sends a synchronizing signal from which an MT mode instruction has been removed and which is used in the previous ST mode upon transmission through channel $$k_{\hat{m},\hat{q}},$$

thereby notifying the terminals in the network that channel $$k_{\hat{m},\hat{q}}$$

will be used in ST mode. Thereafter, all of the devices in the network terminate MT mode, and return to the previous ST mode that uses channel $$k_{\hat{m},\hat{q}}.$$

The present invention is directed to a method of sending a signal while avoiding the influence of an interference signal in the same channel in a communication system including a main communication device and a plurality of terminal communication devices. In the present invention, when devices within a network detect the presence of an interference signal in a channel based on a sent signal and the reception performance of the signal, they communicate through a previously promised multi-channel so as to minimize reductions in transmission performance and the connectivity of the network that are attributable to the interference signal. In the present invention, when interference has been generated in a frequency band wider than that of a communication system in operation for a relatively long time, transmission and reception is made to be performed through a multi-channel that is determined based on the channel and bandwidth information of the interference signal, thereby considerably reducing the time it takes to avoid interference. If a channel whose transmission performance is higher than a reference value is present within a multi-channel, devices within a network return to previous communication mode using this single channel, thereby being able to avoid the influence of interference.

The invention claimed is:

1. A method of performing transmission while avoiding interference in a same channel, the method sending a signal while avoiding influence of an interference signal generated in a channel currently being used in a communication system including a coordinator for periodically sending or receiving a signal through only one of a plurality of available transmission channels and a plurality of terminal devices, the method comprising the steps of:
   (A) detecting whether an interference signal is present in a transmission channel that is being used by communication devices in the communication system in a distributed manner, the communication devices including the coordinator and the terminal devices;
   (B) if the presence of the interference signal is detected at step (A), temporarily sending and receiving, by the communication devices in the communication system, signals through transmission channels, except for the transmission channel currently being used by the communication devices, in order to avoid interference; and
   (C) determining a channel having best link quality condition, selected from among the transmission channels used at step (B), to be a transmission channel and returning to previous transmission mode that uses a single channel.

2. The method of claim 1, wherein step (A) comprises the steps of:
   if a transmission error occurs in the coordinator of the communication system, detecting the presence of the interference signal during an inactive period in which a signal is not sent using a conventional channel sensing technique, or if transmission performance is lower than a predetermined reference value, detecting the presence of the interference signal in the channel being used;
   if a terminal device in the system has not successively received a synchronizing signal, which is periodically sent by the coordinator a predetermined number of times, or if the terminal device has received a synchronizing signal into which an interference detection signal has been inserted, acknowledging the presence of the interference signal in the channel being used; and
   if the terminal device receives the synchronizing signal after it has not received the synchronizing signal a predetermined or smaller number of times, notifying the coordinator that the interference signal is present in the channel being used, thereby making the coordinator acknowledge the presence of the interference signal.

3. The method of claim 1, wherein step (B) comprises the steps of:
   (B-1) if the interference signal is detected in the channel being used by the communication devices, determining candidate transmission channels that will be temporality used in order to avoid interference; and
   (B-2) if the presence of the interference signal is detected in the channel being used at step (A), temporarily sending and receiving signals through the candidate transmission channels determined at step (B-1) by means of a frequency hopping.

4. The method of claim 3, wherein step (B-1) comprises the steps of:
   determining M candidate transmission channels that satisfy requirements by Equations 1 and 2 among N transmission channels available in the system, while taking characteristics of the interference signal into consideration $$|k_m - \tilde{k}| \geq \left\lfloor \frac{W}{d} \right\rfloor; \quad 1 \leq m \leq M \tag{1}$$

$$|k_i - k_j| \geq \left\lfloor \frac{W}{d} \right\rfloor; \quad 1 \leq i, j \leq M \text{ and } i \neq j; \tag{2}$$

where W is a bandwidth of a primary interference signal, k is an index of a candidate transmission channel, $\tilde{k}$ is an index of the channel that is currently being used by the system, d is frequency spacing between adjacent channels,
   and
   determining, by the communication devices, a set of candidate transmission channels, $\Omega_M(\hat{q})$, which contains the candidate transmission channels, on attribute values of a network in order to reduce a burden of message exchange for the coordinator to transfer information on the determined candidate transmission channels to the terminal devices.

5. The method of claim 4, wherein the step of determining a set of candidate transmission channels $\Omega_M(\hat{q})$ comprises the step of:
   determining set index $\hat{q}$ of $\Omega_M(\hat{q})$ using a pseudo-random method, as shown in Equation 3, $$\hat{q} = 1 + (\text{ID.mod}.n(\Omega_M)) \tag{3}$$

where ID is an ID index of the network, ".mod." is a remainder operation, and $n(\Omega_M)$ is a total number of sets of candidate transmission channels, each of which has candidate transmission channels that can be generated in the above determination process.

6. The method of claim 3, wherein step (B-2) comprises the steps of:
   if the coordinator detects the presence of the interference signal at step (A), repeatedly sending a synchronizing signal, which includes an interference detection signal, during a next active period, and then temporarily sending a signal sequentially using the candidate transmission channel determined at step (B-1) by means of frequency hopping during the active period; and
   if the communication device detects the presence of the interference signal at step (A), detecting the synchronizing signal sent by the coordinator through a candidate transmission channel during period $T_{sync,MT}$ determined by Equation 4, and, if the synchronizing signal is detected, temporarily sending and receiving signals through the candidate transmission channels determined at step (B-1) by means of frequency hopping, $$T_{sync,MT} = \begin{cases} T_{sf}, \text{ in the case in which } \textit{interference is} \text{ detected by} \\ \quad \text{receiving synchronizing} \\ \quad \text{singnal into which inteference detection signal has} \\ \quad \text{been inserted} \\ MT_{sf}, \text{ in the case in which } \textit{interference is} \text{ detected} \\ \quad \text{by successively} \\ \quad \text{losing synchronizing signal predetermined number of} \\ \quad \text{times} \end{cases} \quad (4)$$

where $T_{sf}$ is a period of the synchronizing signal, which is sent by the coordinator through the candidate transmission channels, and, if the detection of the synchronizing signal has failed more than a predetermined number of times, the communication device becomes an orphan device and should initiate a network joining process again.

7. The method of claim 1, wherein step (C) comprises the steps of:

measuring, by the coordinator, link quality of candidate transmission channels during a predetermined interval, and selecting, by the coordinator, a transmission channel having best link quality condition; and sending a normal synchronizing signal which does not include the interference detection signal through the selected transmission channel, and then returning to a normal transmission and reception mode in which all of the communication devices in the system use selected single transmission channel, through the selected transmission channel.

\* \* \* \* \*